INVENTORS:
HEINZ, SCHIPPERS
FRIEDHELM HENSEN 3,664,795
SCREW EXTRUDERS WITH DUAL SECTION
EJECTION ZONE
Heinz Schippers and Friedhelm Hensen, Remscheid-Lennep, Germany, assignors to Barmag Barmer Maschinenfabrik Aktiengesellschaft, Wuppertal, Germany
Filed July 1, 1969, Ser. No. 838,077
Claims priority, application Germany, July 2, 1968,
P 17 79 055.5
Int. Cl. B29f 3/02
U.S. Cl. 425—208      7 Claims

ABSTRACT OF THE DISCLOSURE

Screw extruders for extrusion of high viscosity thermoplastic melts embodying a dual section ejection zone wherein the downstream section has up to eight times the length of the upstream section and also a greater thread depth of the screw portion therein.

INTRODUCTION

The invention relates to screw extruders especially adapted for the melting of highly viscous thermoplasts and the extruding of the melt of up to 35,000 poise through nozzles, wherein the thermoplastic material is melted and compressed by friction and additional heating.

As is well known, in the processing of thermoplasts of high melt viscosity on screw extrusion presses of usual construction, heat is generated which can cause such severe increases in temperature, that the plastic is damaged in its molecular structure and in the further treatment, by reason of its thermal decomposition, cannot be handled correctly. Such heat generation results from inner friction through the shearing by the screw of such high-viscosity compositions.

According to experience, the occurrence of undesired friction heat and a temperature increase due to it can be reduced if the screw extruder as such is shortened. In such case, however, the frequently necessary intermixing or after-mixing of the melt is often inadequate. The basis on which the worm extruder length is shortened presumes that the materials to be processed always have a melt viscosity of a constant level. An inadmissible overheating can be prevented by enlarging the screw spiral volume at the sacrifice, however, of uniform heating of the thermoplasts.

For the spinning of synthetic threads as well as for the production of films, an increasing effort is being made to use thermoplasts of high viscosity, thus, for example, in the case of high or low-pressure polyethylene, polypropylene, polyamide, etc., since in respect to their strength, stretch and other properties they offer considerable advantages over low-viscosity synthetics. These thermoplasts, on the other hand, can be worked only with difficulty on screw extruders because, for example, of their temperature sensitivity and the danger of their thermal decomposition.

According to the concepts underlying the invention, such difficulties can be excluded from the outset, if a screw extruder of otherwise usual construction type is designed in such a manner that the melt, after passing through the metering zone and before entry into the die nozzle of the extruder, undergoes no further heating, especially through shearing and friction heat. Simultaneously, with thorough mixing, it may be subjected to a controlled reduction of the placewise or local overheating.

DESCRIPTION OF THE INVENTION

In order to achieve these objectives according to the invention, a screw extruder of the type described earlier is constructed with the ejection zone consisting of two sections, of which the second in melt flow direction has a greater length of up to eight times over the upstream, first section as well as a considerably increased screw thread depth, in particular a double to quintuple depth relative to the screw thread depth of the first section. In the second section of the ejection zone the screw can have additionally an increased clearance between the edges of the screw flights and the screw passage and/or the screw core can be constructed with conical or parabolic tapering toward the downstream end.

Through these measures there can be combined the known advantages of a short screw with those of a deep screw. A screw extruder constructed in such a manner is not to the same extent viscosity-dependent as a short-worm screw extruder or a screw extruder solely with great thread depth. Furthermore, however, it is possible for these measures also to achieve the often-desired, necessary after-homogenization or reaction of melt mixture components still unreacted in the melt.

In further development of the invention, with uniformly cylindrical screw passage, either the screw core can be stepped or tapered in the ejection zone. In the case of a uniformly cylindrical or a tapering screw core, the screw passage can be enlarged stepwise in the ejection zone, in which system the screw diameter is in each case adapted to the diameter of the screw passage. In both cases an enlargement of the passage volume is achieved so that the shearing becomes less.

On the other hand, the increased screw thread depth also increases the melt propulsion by the screw, which can lead to difficulties. For the case in which the screw pitch is constant in both sections, it is suggested that the screw may be provided in the ejection zone with openings or interruptions in the screw flights to assure uniform, overall conveyance through the screw extruder. Through this measure an additional mixing of the melt is simultaneously achieved. For the same purpose cam-like projections or similar mixing elements may be connected to the screw core in this zone.

If, however, it is desired to avoid such deflections or partial back flows of the melt, then, for the purpose of a uniform conveyance, the screw pitch especially in the second section of the ejection zone, can be adapted to the increased thread depth in such a manner that an equal thread channel volume remains preserved over the screw length. With a constant change in the screw core diameter this would also mean a constant change of the screw thread pitch.

Finally, it is frequently not sufficient that the melt be conveyed onward in the ejection zone to the extrusion nozzle with avoidance of friction heat. Depending on the materials to be worked or the subsequent process, there is required in this zone either a supplementary cooling or a supplementary heat-maintenance heating, which should be arranged to switch on or off, as needed.

The special advantage of the measures described individually above in the construction of a screw extruder lies essentially in that these extruders can be used for the working both of low and also of high-viscosity substances with good homogenization of the material. There the homogenizing and conveyance of a low-viscosity material, i.e., a readily flowable, fluid material, occurs in the section of the ejection zone with more shallow depth screw flights, and the homogenizing and conveyance of a high-viscosity material takes place in the section with the deeper screw flights at the downstream end of the ejection zone.

DESCRIPTION OF THE DRAWINGS

In the drawing there are represented schematically several preferred embodiments of the invention.

FIG. 1 represents a screw extruder of usual type with the conveyor screw 2 rotatable in the cylindrical passage 1$a$ of the extruder barrel 1. The material to be processed is supplied in known manner through the feed tube 3 and conveyed from left to right through the entry zone A into the compression zone B, from this into the metering or ejection zone C and then directly or indirectly to the extrusion nozzle (not shown). According to the invention the metering or ejection zone C consists of the two sections $C_1$ and $C_2$ of equal or different length. The section $C_2$ can be several folds longer than the section $C_1$, preferably doubled, and under certain conditions dependent on the material, up to eight times.

The outer diameter of the screw flights 2$a$ is constant over the screw length. The screw 2 has in section $C_2$, as compared to section $C_1$, a thread depth of its screw flights at least doubled up to quintuple, with equal thread pitch. The diameter of the screw core 4 in section $C_2$ is reduced stepwise with respect to that in section $C_1$ to provide the thread depth increase.

Figure 1:
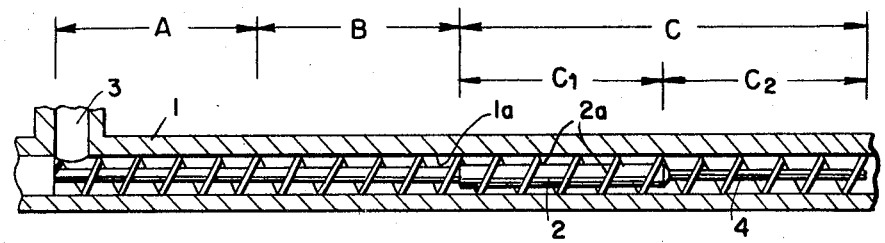
FIG. 1 is a diagrammatic, cross section of a screw extruder in which, in the second section $C_2$ of the ejection zone, a screw of equal thread pitch has a stepwise reduced screw core diameter as compared to the first section $C_1$.
Figure 2:
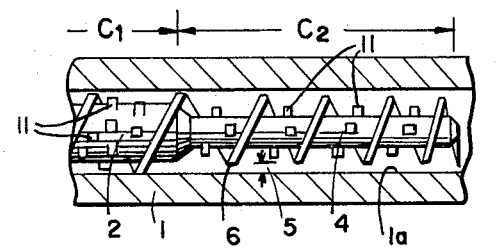
FIG. 2 is a diagrammatic, fragmentary, cross section of the ejection zone of a screw extruder wherein the screw portion in the second section $C_2$ has a progressively decreasing screw pitch and a core with its diameter reduced stepwise with respect to the first section plus a greater clearance between the outer edges of the screw flights and the screw passage.
Figure 3:
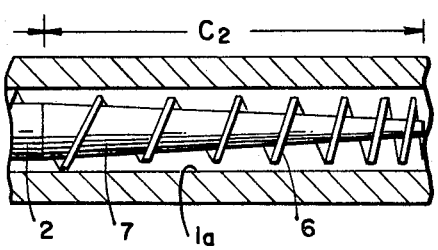
FIG. 3 is a view similar to FIG. 2 of an embodiment with a screw having its core tapering toward the downstream end.

FIG. 2 shows the end of the same or of a similar screw extruder with a modified second section $C_2$ of the ejection zone. The screw 2 has in this section an increased clearance 5 between the outer periphery of the screw flights 6 and the screw passage 1$a$, as well as a progressively decreasing screw pitch. Here, however, it is also possible, as shown in FIG. 3, for the crew core to taper toward the downstream end as shown for screw core section 7, the taper being either conical or parabolic.

Figure 4:
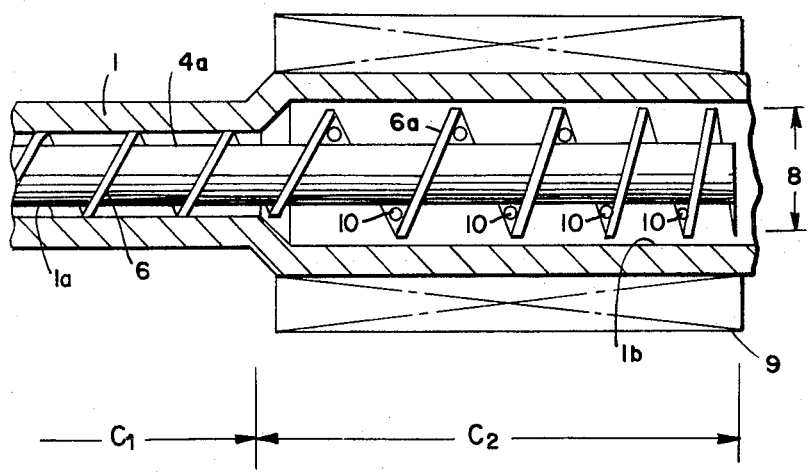
FIG. 4 is a diagrammatic, fragmentary, cross section of another embodiment with a stepped diameter screw passage and correspondingly increased screw flight diameter.

FIG. 4, finally, represents likewise the downstream end of a screw extruder at the section $C_2$ of the ejection zone. Here, with the screw core 4$a$ remaining constant over the length of the screw, the thread depth in this section $C_2$ is enlarged. The outside diameter 8 of the screw flights 6$a$ and also the inside diameter of the screw passage 1$b$ in this section are increased with respect to screw flights 6 and screw passage 1$a$ of section $C_1$. A cooling and/or heat-maintaining heating device 9 may surround the screw barrel 1.

In the second section of the ejection zone, the screw flights can be provided with openings 10 or interruptions (e.g., slots or spaces). On the screw core there can be provided between the screw flights of the whole ejection zone or in its second section baffle-like or cam-like projections 11 or other mixing elements.

The material fed into the screw extruder is conveyed, melted and compressed in a known manner by the screw. As a melt it undergoes, before entry into the extrusion nozzle, a steady thorough intermixing or after-mixing in the second section of the ejection zone with an increased conveyance volume (volume of material impelled forwardly per rotation of the screw), and possibly a different residence time in each section, with avoidance of any damaging of viscous substances by local friction heat. The invention, therefore, is especially well suited for viscous thermoplasts and such spinning qualities thereof as have to be provided in a narrowly limited temperature range or wherein a subsequent homogenization or ripening of mixing components is required.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A screw extruder adapted for extrusion of high viscosity thermoplasts and melts of up to 35,000 poise viscosity through an extrusion die, which comprises an elongated extruder barrel having a cylindrical passage extending longitudinally therethrough, a screw extending longitudinally through and rotatable in said cylindrical passage for conveying said thermoplasts and melts from an upstream, feed end of said passage to a downstream, discharge portion thereof, the upstream end of said passage providing an entry zone followed by a compression zone for the melting of the thermoplast during passage thereof through said zones by friction and shear forces imparted by the rotation of said screw, and the downstream portion of said passage being an ejection zone characterized by an upstream section and a downstream section, the downstream section having a length of two to eight times the length of the upstream section, said screw having a screw core and screw flights about said core, the screw flight of said screw being of substantially uniform diameter from said entry zone through said upstream section of said downstream portion, the core of said screw in said upstream section being larger than the screw core in said entry and compression zones and also larger than the screw core in said downstream section, and the thread depth of the screw flights in the downstream section of the ejection zone being double to quintuple the thread depth of the screw flights in said upstream section.

2. A screw extruder as claimed in claim 1, the flights of said screw in said ejection zone having a progressively decreasing screw pitch.

3. A screw extruder as claimed in claim 2, wherein the core of said screw in said downstream section of the ejection zone is tapered in the downstream direction.

4. A screw extruder as claimed in claim 1, wherein the core of said screw in said downstream section of the ejection zone is tapered in the downstream direction.

5. A screw extruder as claimed in claim 1, the periphery of said screw flights and said passage being spaced in a manner providing clearances therebetween which are greater in said downstream section of the ejection zone than in the upstream section.

6. A screw extruder as claimed in claim 1, said screw core in the ejection zone having cam-like projections thereon.

7. A screw extruder as claimed in claim 1, wherein the screw barrel at the downstream section of the ejection zone is equipped with heating means.

(References on following page)

References Cited

UNITED STATES PATENTS

| | | | |
|---|---|---|---|
| Re. 17,070 | 8/1928 | Gordon | 18—12 SF |
| 2,833,750 | 5/1958 | Vickers | 18—12 SF |
| 3,296,659 | 1/1967 | Okazaki | 18—12 SF |
| 3,339,631 | 9/1967 | McGurty et al. | 18—12 SF |
| 3,197,814 | 8/1965 | Bond, Jr. et al. | 18—12 SF |
| 2,731,247 | 1/1956 | Hudry | 18—12 SF |
| 2,743,812 | 5/1956 | Ljungberg | 18—12 SF |
| 2,518,124 | 8/1950 | Corbett | 18—12 SF |
| 2,642,898 | 6/1953 | Acock et al. | 18—12 SF |
| 2,506,101 | 5/1950 | Oltz | 18—12 SF |
| 2,752,633 | 7/1956 | Weitzel | 18—12 SF |

THERON E. CONDON, Primary Examiner

H. M. CULVER, Assistant Examiner

U.S. Cl. X.R.

425—376